US008254432B2

(12) United States Patent
Kent et al.

(10) Patent No.: US 8,254,432 B2
(45) Date of Patent: *Aug. 28, 2012

(54) METHOD AND SYSTEM FOR SINGLE ANTENNA RECEIVER SYSTEM FOR W-CDMA (75) Inventors: Mark Kent, Vista, CA (US); Vinko Erceg, Cardiff, CA (US); Uri M. Landau, San Diego, CA (US); Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/237,717

(22) Filed: Sep. 20, 2011

(65) Prior Publication Data

US 2012/0082189 A1 Apr. 5, 2012

Related U.S. Application Data (63) Continuation of application No. 11/173,911, filed on Jun. 30, 2005, now Pat. No. 8,023,554.

(60) Provisional application No. 60/616,413, filed on Oct. 6, 2004.

(51) Int. Cl.
*H04B 1/00* (2006.01)
(52) U.S. Cl. ........ 375/148; 375/144; 375/232; 375/349; 375/350
(58) Field of Classification Search .................. 375/130, 375/140–145, 147–153, 229, 230, 232, 316, 375/346–350
See application file for complete search history.

(56) References Cited

U.S. PATENT DOCUMENTS

| 5,406,585 | A | * | 4/1995 | Rohani et al. ............ 375/341 |
| 5,736,964 | A | * | 4/1998 | Ghosh et al. ............. 342/457 |
| 6,128,276 | A | * | 10/2000 | Agee ..................... 370/208 |
| 6,208,632 | B1 | * | 3/2001 | Kowalski et al. ......... 370/335 |
| 8,023,554 | B2 | * | 9/2011 | Kent et al. .............. 375/148 |
| 2002/0126745 | A1 | * | 9/2002 | Prysby et al. ............ 375/148 |
| 2003/0031234 | A1 | * | 2/2003 | Smee et al. ............. 375/147 |
| 2003/0039302 | A1 | * | 2/2003 | Castelain et al. ........ 375/147 |
| 2003/0133424 | A1 | * | 7/2003 | Liang et al. ............. 370/335 |
| 2003/0148780 | A1 | * | 8/2003 | Takano .................. 455/522 |
| 2003/0161390 | A1 | * | 8/2003 | Teague et al. ........... 375/148 |
| 2004/0139466 | A1 | * | 7/2004 | Sharma et al. ........... 725/72 |
| 2005/0047485 | A1 | * | 3/2005 | Khayrallah et al. ....... 375/148 |
| 2005/0111526 | A1 | * | 5/2005 | Bilgic et al. ............ 375/147 |
| 2005/0149838 | A1 | * | 7/2005 | Chiueh et al. ........... 714/795 |
| 2005/0243898 | A1 | * | 11/2005 | Reznik et al. ........... 375/147 |
| 2006/0039330 | A1 | * | 2/2006 | Hackett et al. .......... 370/335 |
| 2006/0072691 | A1 | * | 4/2006 | Kent et al. .............. 375/349 |
| 2007/0015545 | A1 | * | 1/2007 | Leifer et al. ............ 455/562.1 |
| 2007/0165707 | A1 | * | 7/2007 | Margetts et al. ......... 375/150 |
| 2008/0043680 | A1 | * | 2/2008 | Fitton .................... 370/335 |
| 2008/0187034 | A1 | * | 8/2008 | Liang et al. ............. 375/232 |

* cited by examiner

*Primary Examiner* — David C. Payne
*Assistant Examiner* — James M Perez
(74) *Attorney, Agent, or Firm* — Sterne, Kessler, Goldstein & Fox PLLC (57) ABSTRACT A receiver receives chip-level data items via a plurality of individual distinct path signals in a signal cluster that is wirelessly received. Channel estimates and timing reference signals, and lock indications of valid components values in the channel estimates are generated utilizing the received chip-level data items. Rake receiver fingers are assigned to the received individual distinct path signals based on the generated channel estimates and timing reference signals, and/or the lock indications. Each of the received chip-level data items corresponds to one of the assigned rake receiver fingers. At least a portion of the received chip-level data items may be combined utilizing the assigned rake receiver fingers. The generated one or more combined chip-level data items may be despreaded to generate corresponding symbol-level data.

20 Claims, 5 Drawing Sheets

METHOD AND SYSTEM FOR SINGLE ANTENNA RECEIVER SYSTEM FOR W-CDMA

CROSS-REFERENCE TO RELATED APPLICATIONS/INCORPORATION BY REFERENCE

This application is a continuation of U.S. application Ser. No. 11/173,911 filed on Jun. 30, 2005. The above stated application is incorporated herein by reference in their entirety.

This application is related to the following applications, each of which is incorporated herein by reference in its entirety for all purposes:
U.S. patent application Ser. No. 11/173,870 filed Jun. 30, 2005;
U.S. patent application Ser. No. 11/174,303 filed Jun. 30, 2005;
U.S. patent application Ser. No. 11/173,502 filed Jun. 30, 2005;
U.S. patent application Ser. No. 11/173,871 filed Jun. 30, 2005;
U.S. patent application Ser. No. 11/173,964 filed Jun. 30, 2005;
U.S. patent application Ser. No. 11/173,252 filed Jun. 30, 2005;
U.S. patent application Ser. No. 11/174,252 filed Jun. 30, 2005;
U.S. patent application Ser. No. 11/172,756 filed Jun. 30, 2005;
U.S. patent application Ser. No. 11/173,305 filed Jun. 30, 2005;
U.S. patent application Ser. No. 11/172,759 filed Jun. 30, 2005;
U.S. patent application Ser. No. 11/173,689 filed Jun. 30, 2005;
U.S. patent application Ser. No. 11/173,304 filed Jun. 30, 2005;
U.S. patent application Ser. No. 11/173,129 filed Jun. 30, 2005;
U.S. patent application Ser. No. 11/172,779 filed Jun. 30, 2005;
U.S. patent application Ser. No. 11/172,702 filed Jun. 30, 2005;
U.S. patent application Ser. No. 11/173,727 filed Jun. 30, 2005;
U.S. patent application Ser. No. 11/173,726 filed Jun. 30, 2005;
U.S. patent application Ser. No. 11/172,781 filed Jun. 30, 2005;
U.S. patent application Ser. No. 11/174,067 filed Jun. 30, 2005;
U.S. patent application Ser. No. 11/173,854 filed Jun. 30, 2005; and
U.S. patent application Ser. No. 11/174,403 filed Jun. 30, 2005.

FIELD OF THE INVENTION

Certain embodiments of the invention relate to communication receivers. More specifically, certain embodiments of the invention relate to a method and system for single antenna receiver system for W-CDMA.

BACKGROUND OF THE INVENTION

Figure 1A:
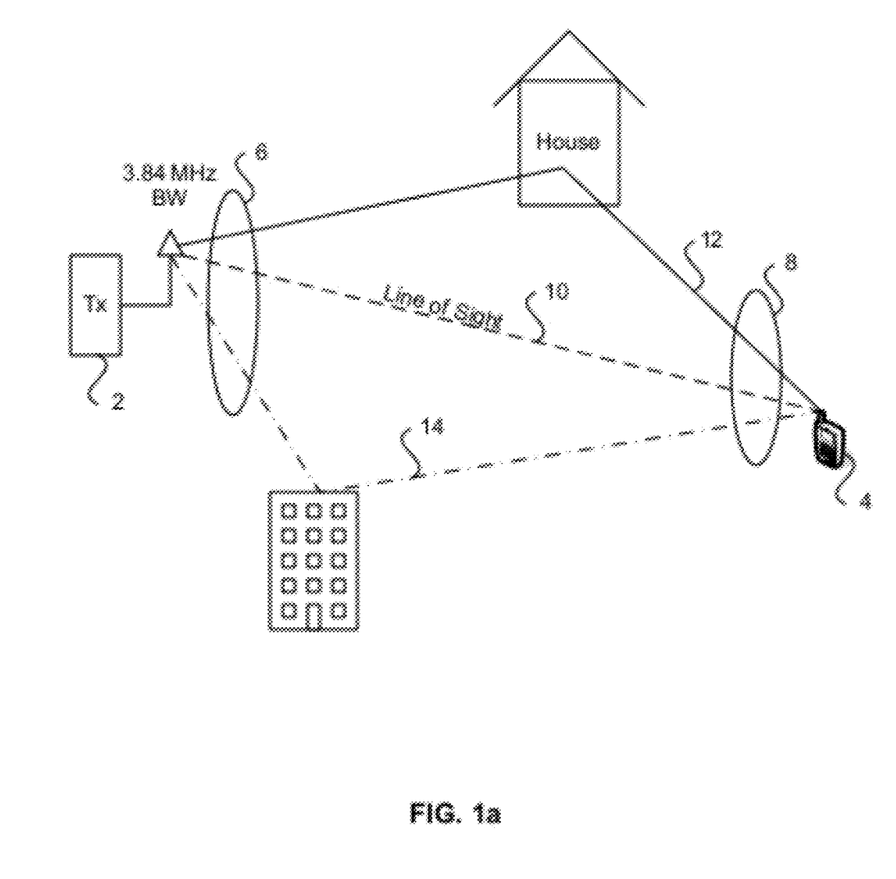
FIG. 1a is a diagram exemplary of copies of a transmitted signal that may be received by a mobile receiver.

A wideband code division multiple access (W-CDMA) base transceiver station (BTS) may transmit a signal, which may be reflected, and/or attenuated by various obstacles and surrounding objects. As a result, various copies of the transmitted signal, at various power levels, may be received at the mobile station comprising different time offsets. FIG. 1a is a diagram exemplary of copies of a transmitted signal that may be received by a mobile receiver. Referring to FIG. 1a, there is shown a transmitter 2, a receiver 4, the group of transmitted signals 6, the group of received signals 8, and individual copies of the transmitted signals 10, 12, and 14. The plurality of signals 10, 12, and 14, received by a receiver 104 may be referred to as multipath signals while each signal in the multipath may be referred to as an individual distinct path signal. An individual distinct path signal may correspond to a path. A rake receiver may be deployed to demodulate individual distinct path signals, with each of a plurality of fingers assigned to track and demodulate one component of the multipath. The output of the fingers may then be combined and further demodulated and decoded. The fingers may be adapted to receive and process as much of the received signal energy as practicable.

A considerable part of receiver design may involve managing the rake receiver fingers. A functional block known in the art as a "searcher" may be adapted to locating new individual distinct path signals and to allocating rake receiver fingers to the new individual distinct path signals. The searcher may detect a path based on the amount of energy contained in a signal, identify that path if it carries user's data, and subsequently monitor the detected path. Once the detected signal energy in a path is above a given threshold, a finger in the rake receiver may be assigned to the path and the signal energy level constantly monitored.

However, partitioning the received signal into several fingers, each of which may process and exploit energy in a single individual distinct path, may have limitations. For example, a group of individual distinct path signals may rarely be characterized by a few discrete times of arrival. The result may be a method and apparatus, for example, a rake receiver, that may be inefficient at exploiting the power in received signals. In addition, utilizing this method may incur high processing overhead in managing the fingers. The total amount of time that transpires comprising the time to identify a path, to the time required to assign a finger, and to the time that the signal energy may be exploited, may account for 20-30% of the path life span. Once a finger is assigned to a path, detected energy on the path may be continuously monitored. However by the time that the finger has been assigned, the path energy may be diminished, while energy may rise at a different time of arrival. This may result in the rake receiver constantly searching for new paths, and performing finger de-allocation/allocation cycles. A finger that is allocated to a path with diminishing power may represent misused resources in the mobile terminal, which may in turn result lower performance of the mobile terminal.

Another limitation of a conventional rake receiver may be known in the art as finger merge or 'fat' finger. This is a phenomenon in which paths that are in close temporal vicinity of each may be may be assigned to separate fingers at the rake receiver. Finger merge may have negative implications for system performance for a variety of reasons.

The assignment of more than one finger to a single offset may be a waste of system resources, as the additional finger or fingers may be better deployed to receiving energy from another individual distinct path signal in the multipath, or to receive energy from a signal transmitted from another BTS. In addition, the combined power of the various fingers may often be used to control various system parameters, for example, power control. Without accounting for finger merge, a system may over-estimate the received power due the duplication of energy detected in the combiner, and thus over-compensate by lowering transmit power to a threshold level below that required for adequate communication.

Moreover, combining the output of merged fingers with the output of non-merged fingers may weight both the signal and noise of the merged finger output too heavily in relation to the non-merged finger output, which may result in inefficient exploitation of the received power. There may be a present need in the art to perform path search and resource allocation that reduces the searcher overhead by eliminating the need for micro-managing the fingers.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for single antenna receiver system for W-CDMA, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for single antenna receiver system for WCDMA. Channel estimates may be computed based on at least one of a plurality of received multipath signals, and timing reference signals indicating a location of at least one of the plurality of received multipath signals may be generated. At least a portion of the plurality of received multipath signals may be combined based on the computed channel estimates and/or the generated timing reference signals. The combined multipath signals may be processed as a signal cluster, and transmitted information may be extracted from the combined plurality of received multipath signals. Each of the plurality of multipath signals may be received at different instants in time, the latter of which may be based on the generated timing reference signals. A signal cluster may comprise the combined portion of the plurality of received multipath signals. U.S. application Ser. No. 11/173,854 provides a detailed description of signal clusters and is hereby incorporated herein by reference in its entirety.

Figure 1B:
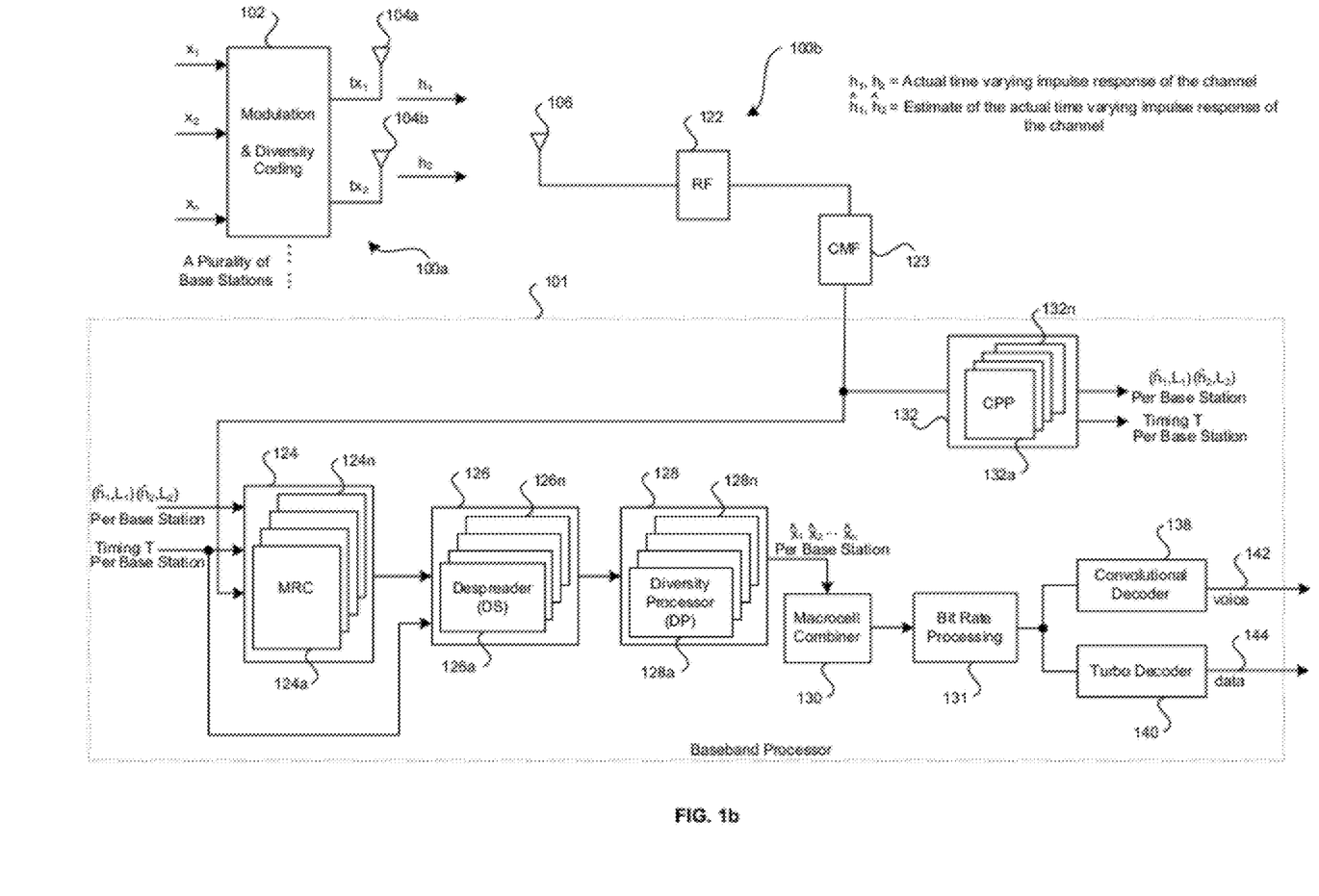
FIG. 1b is a block diagram of an exemplary single antenna receiver system for W-CDMA, in accordance with an embodiment of the invention.

FIG. 1b is a block diagram of an exemplary single antenna receiver system for WCDMA, in accordance with an embodiment of the invention. Referring to FIG. 1b, there is shown a transmitter section 100a, and a receiver section 100b. The transmitter section 100a may comprise a modulation and diversity coding block 102 and a plurality of antennas 104a, 104b. The receiver section 100b may comprise an antenna 106, a RF block 122, a chip matched filter block 123, and a baseband processor 101. The baseband processor 101 may comprise a cluster path processor block 132, a maximum ratio combining block 124, a despreader block 126, a diversity processor block 128, a macrocell combiner block 130, a bit rate processing block 131, a convolutional decoder block 138, and a turbo decoder block 140.

On the transmit side 100a, the modulation and diversity coding block 102 may be adapted to receive inputs $x_1$, $x_2, \ldots, x_n$, and to generate modulated signals $tx_1, tx_2, \ldots, tx_n$ which may be transmitted via antennas 104a, 104b via a plurality of RF channels.

On the receive side 100b, the RF block 122 may comprise suitable logic, circuitry, and/or code that may be adapted to bandlimit the received signal to the correct channel, amplify and convert the received analog RF signal down to baseband. The RF block 122 may comprise an analog-to-digital (A/D) converter that may be utilized to digitize the received analog baseband signal.

The chip matched filter block 123 may comprise suitable logic, circuitry, and/or code that may be adapted to filter the output of the RF block 122 and to produce complex in-phase and quadrature phase components (I, Q) of the filtered signal. In this regard, in an embodiment of the invention, the chip matched filter block 123 may comprise a pair of digital filters that are adapted to filter the I and Q components to within, for example, the 3.84 mHz bandwidth of W-CDMA baseband and matched to the base station transceiver waveform pulse shape.

The cluster path processor (CPP) block 132 may comprise a plurality of cluster processors that may be adapted to receive and process an output of the chip matched filter block 123. A cluster may comprise an aggregate of multipath signals received over a specified time interval, where the specified time interval may be of sufficient length to permit a plurality of multipath signals to be received prior to the transmission of a subsequent signal. In the baseband receiver 101, the cluster path processors $132a, \ldots, 132n$ within the cluster path processor 132 block may be partitioned into pairs of processors, wherein each pair of processors is allocated to a single base station transmit signal. Each base station may transmit from two antennas. The CPP block 132 may track the multipath signal cluster transmitted form each base station transmit antenna in block 104a and 104b. The CPP 132 may also compute complex estimates of the time varying impulse response of the RF channel, or "channel estimates", where the channel estimates may represent estimations of the actual time varying impulse response of the RF channel per base station transmit antenna, the estimates are denoted $\hat{h}_1$ and $\hat{h}_2$. Corresponding lock indicators $L_1$ and $L_2$ may also be generated by the CPP 132. The lock indicators may provide an indication of which components in the corresponding estimates comprise valid component values. In one embodiment of the invention, cluster path processors $132a, \ldots, 132n$ may be configured to operate in pairs when a transmitted signal is transmitted by two antennas, where the two antennas may be located in the same base station, or at different base stations. The configurations in which a receiving antenna receives signals from two transmitting antenna may be described as "receiving modes" in the W-CDMA standard. These receiving modes may comprise closed loop 1 (CL1), close loop 2 (CL2), and space time transmit diversity (STTD). The cluster path processor block 132 may be adapted to assign cluster path processors from the CPP block 132 on a per base station basis.

The maximum-ratio combining block 124 may comprise a plurality of maximum-ratio combining blocks, namely 124a, ..., 124n. Similarly with the cluster path processors 132, maximum-ratio combining blocks 124 may be assigned on a per base station basis, with the maximum-ratio combining blocks 124 communicating with cluster path processors 132 that may be assigned to the same base stations. The maximum-ratio combining blocks 124 may receive timing reference signals, T, and channel estimates and lock indicators, $(\hat{h}_1,L_1)$ and $(\hat{h}_2,L_2)$, from the corresponding cluster path processor blocks 132, which may be utilized by the maximum-ratio combining block 124 to process received signals from the chip matched filter block 123. The maximum ratio combining block 124 may utilize channel estimate components in accordance with the corresponding lock indicator, utilizing channel estimate components that are valid in accordance with the corresponding lock indicator. Channel estimate components that are not valid, in accordance with the corresponding lock indicator, may not be utilized. The maximum-ratio combining block 124 may be adapted to provide a combining scheme or mechanism for implementing a rake receiver which may be utilized with adaptive antenna arrays to combat noise, fading, and, co-channel interference.

In accordance with an embodiment of the invention, each of the maximum-ratio combining blocks 124a, ..., 124n may comprise suitable logic, circuitry, and/or code that may be adapted to add individual distinct path signals, received from the assigned RF channel, together in such a manner to achieve the highest attainable signal to noise ratio (SNR). The highest attainable SNR may be based upon a maximal ratio combiner. A maximal ratio combiner is a diversity combiner in which each of the multipath signals from all received multipaths are added together, each with unique gain. The gain of each multipath before summing can be made proportional to the received signal level for the multipath, and inversely proportional to the multipath noise level. Each of the maximum-ratio combining blocks may be also adapted to utilize other techniques for signal combining such as selection combiner, switched diversity combiner, equal gain combiner, or optimal combiner.

In various embodiments of the invention, the assignment of fingers in the maximum-ratio combining block 124 may be based on the timing reference signal, T, from the cluster path processor block 132. The proportionality constants utilized in the maximum-ratio combining block 124 may be based on the valid channel estimates, $\hat{h}_1$ and $\hat{h}_2$, from the cluster path processor block 132.

The despreader block 126 may comprise a plurality of despreader blocks 126a, ..., 126n. Each of the despreader blocks 126a, ..., 126n may comprise suitable logic, circuitry, and/or code that may be adapted to despread received signals that had previously been spread through the application of orthogonal spreading codes in the transmitter. Prior to transmission of an information signal, known as a "symbol", the transmitter may have applied an orthogonal spreading code that produced a signal comprising a plurality of "chips". The despreader block 126 may be adapted to generate local codes, for example Gold codes or orthogonal variable spreading factor (OVSF) codes, that may be applied to received signals through a method which may comprise multiplication and accumulation operations. Processing gain may be realized after completion of integration over a pre-determined number of chips in which the symbol is modulated.

Following despreading at the receiver, the original symbol may be extracted. W-CDMA may support the simultaneous transmission of a plurality of spread spectrum signals in a single RF signal by utilizing spreading codes among the spread spectrum signals which are orthogonal to reduce multiple access interference (MAI). The receiver may extract an individual symbol from the transmitted plurality of spread spectrum signals by applying a despreading code, which is equivalent to the code that was utilized to generate the spread spectrum signal. Similarly with the cluster path processors 132, and the maximum-ratio combining blocks 124, the despreader blocks 126 may be assigned on a per base station basis, with the despreader blocks 126 communicating with maximum-ratio combining blocks 124 that may be assigned to the same base stations.

The diversity processor 128, comprising a plurality of diversity processor blocks 128a, ..., 128n, may comprise suitable logic, circuitry, and/or code that may be adapted to combine signals transmitted from multiple antennas in diversity modes. The diversity modes may comprise OL, CL1 and CL2. The diversity processor 128 may combine signals transmitted from multiple antennas that are located at the same base station. Similarly with the cluster path processors 132, the maximum-ratio combining blocks 124, and the despreader blocks 126, the diversity processors 128 may be assigned on a per base station basis, with the diversity processors 128 communicating with despreader blocks 126 that may be assigned to the same base stations.

The macrocell combiner 130 may comprise suitable logic, circuitry, and/or code that may be adapted to achieve macroscopic diversity. The macroscopic diversity scheme may be utilized for combining two or more long-term lognormal signals, which may be obtained via independently fading paths received from two or more different antennas located at different base-station sites.

The bit rate processing block 131 may comprise suitable logic, circuitry and/or code to process frames of data received from the macrocell combiner 130. The processing may further comprise depuncturing, and deinterleaving data in the received frame, and further determining a rate at which processed frames are communicated in output signals.

The convolutional block 138 may comprise suitable logic, circuitry, and/or code that may be adapted to handle decoding of convolutional codes. In particular, the convolutional block 138 may process received signals containing voice.

The turbo decoder block 140 may comprise suitable logic, circuitry, and/or code that may be adapted to handle decoding of turbo codes. In particular, the turbo decoder block 140 may process received signals containing data.

In operation, the transmitter side 102a may be adapted to modulate the input data signals $x_1, x_2, \ldots x_n$ and generate the output signal $tx_1$, $tx_2$ which may be transmitted via antenna 104a and 104b. The signals transmitted from antenna 104a may utilize signal propagation paths to the receiver 100b, which may be different from the signal propagation paths utilized by signals transmitted from antenna 104b. On the receiver side, the transmitted output signals $tx_1$, $tx_2$, along with a plurality of multipath signals associated with $tx_1$ and $tx_2$ respectively, may be received at the antenna 106, and processed by the RF block 122. The resulting digitized output signal from the RF block 122 may be filtered and bandwidth limited to the W-CDMA signal bandwidth. The filtered output of the chip matched filter 123 may be processed by pairs of processors in the cluster path processor block 132, for example processors 132a and 132b. Processor 132a may generate a set of channel estimates and lock indicators, ($\hat{h}_1$, $L_1$), and a timing reference signal $T_1$. Processor 132b may generate a set a channel estimates and lock indicators, ($\hat{h}_2$,$L_2$), and a timing reference signal $T_2$. Processor 132a and processor 132b may generate channel estimates and timing reference signals based on received signals from a single base station. There may be a deterministic relationship between the timing reference signals such that given, for example, $T_1$, it may be possible to determine $T_2$, and/or vice versa. In such case, only one timing reference signal, T, which may be based on at least one of $T_1$ or $T_2$, may be communicated to the maximum-ratio combining block 124.

The maximum-ratio combining block 124 may be adapted to utilize the channel estimates and lock indicators ($\hat{h}_1$,$L_1$), ($\hat{h}_2$,$L_2$) and timing information T per base station to assign rake fingers to received individual distinct path signals and to assign proportionality constants to each finger. Received individual distinct path signals may be processed in the maximum-ratio combining block 124 as signal clusters comprising a plurality of received individual distinct path signals. In an embodiment of the invention, the maximum-ratio combining block 124 may assign a time, T(n), to the $n^{th}$ grid element of the CPP 132, where the plurality of times T(n) may be based on the timing reference T. Given a time assignment, and a time offset, $t_{off}$, a given CPP 132, n, may detect an individual distinct path signal that is received during a time interval starting at $[T(n)-t_{off}/2]$, and ending at $[T(n)+t_{off}/2]$.

The individual distinct path signals received collectively for each CPP 132 may constitute a signal cluster. The relationship of the values T(n) among the processing elements of the CPP 132 in the receiver may be such that $T(n+1)-T(n)$ is equal to a constant value for values of n among the set of fingers. Thus, once T is determined, the timing relationships for the receipt of the plurality of individual distinct path signals constituent in the signal cluster may be determined. The time offset value, $t_{off}$, may represent a time duration, which is at least as long as the period of time required for transmitting the plurality of chips contained in a symbol. For example, if the symbol comprises 16 chips, and the W-CDMA chip rate is $3.84 \times 10^6$ chips/second, then the time offset $t_{off}$ may be $(16/3.84 \times 10^6)$ seconds, or approximately 4 microseconds.

Embodiments of the invention may not be limited to values of the difference $T(n+1)-T(n)$ being constant among all n fingers in a rake receiver. However, each value, T(n), may be based on the timing reference signal, T.

The maximum-ratio combining block 124 may proportionately scale and add the received individual distinct path signals to produce a chip level output, which may be communicated to the despreader block 126. The despreader block 126 may be adapted to despread the chip level signal received from the maximum-ratio combining block 124 to generate estimates of the original data, $x_1, x_2, \ldots, x_n$, which was transmitted by the base station 102. The diversity processor block 128 may be adapted to provide diversity processing and to generate output data estimates on a per base station basis. The macrocell combiner block 130 may achieve macroscopic diversity when a received signal has been transmitted by a plurality of base stations. The bit rate processing block 131 may perform processing tasks comprising depuncture and deinterleave on received frames of data that are communicated in received individual distinct path signals. The bit rate processing block 131 may determine a rate at which to communicate processed frames of data to the convolutional decoder block 138, and/or the turbo decoder block 140. The convolution decoder block 138 may be adapted to perform convolutional decoding on the voice portion of the signal generated from an output of the bit rate processing block 131. The turbo decoder block 140 may be adapted to perform turbo decoding on the data portion of the signal generated from an output of the bit rate processing block 131.

Figure 2A:
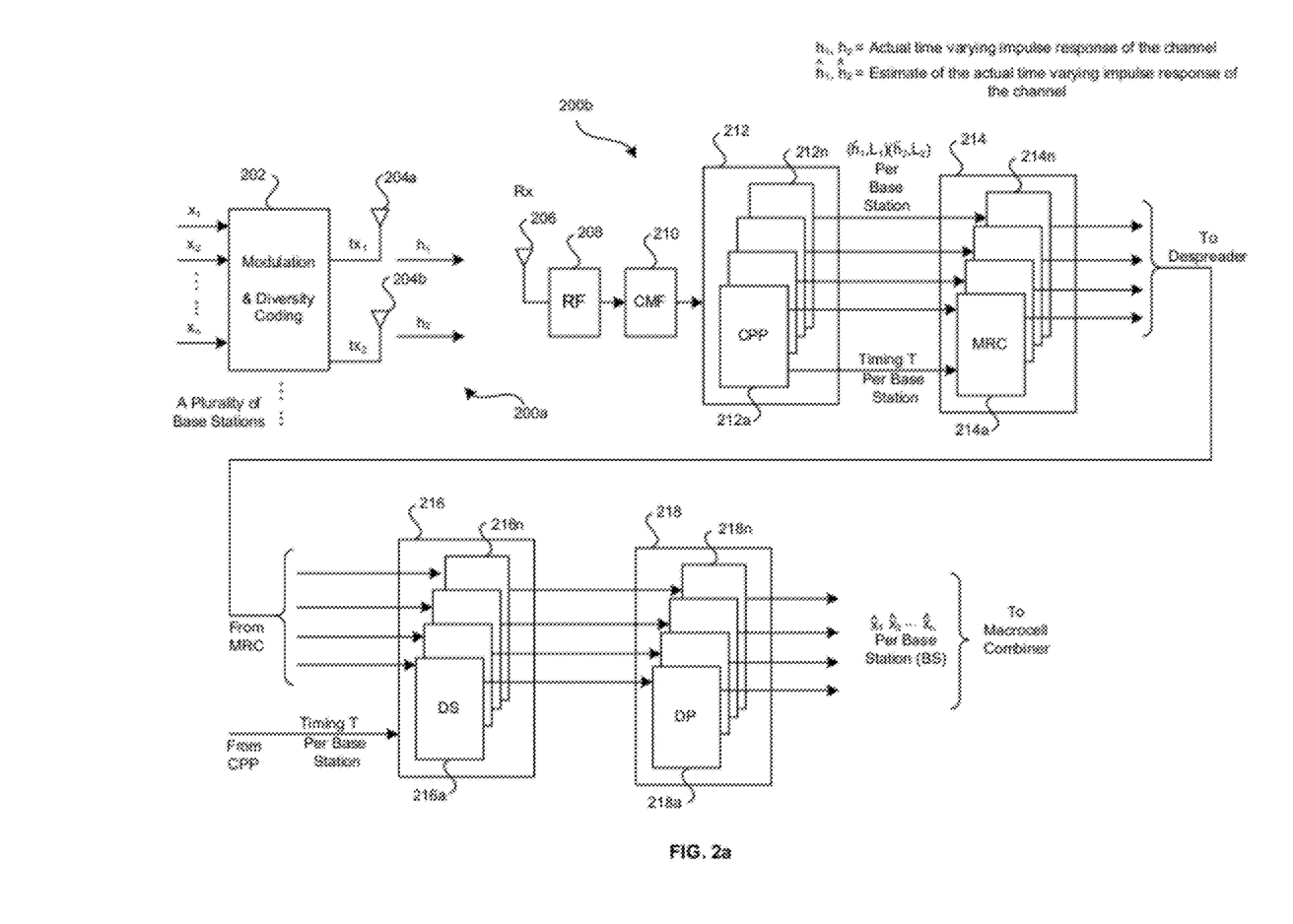
FIG. 2a is a diagram illustrating the configuration of the cluster path processors and maximum-ratio combining of FIG. 1b, in accordance with an embodiment of the invention.

FIG. 2a is a diagram illustrating the configuration of the cluster path processors and maximum-ratio combining of FIG. 1b, in accordance with an embodiment of the invention. Referring to FIG. 2a, there is shown a transmit side 200a and a receive side 200b. The transmit side 200a comprises a plurality of base stations, one of which is illustrated having a modulation and diversity coding block 202 and transmitting antennas 204a and 204b. Inputs to the modulation and diversity coding block 202 may comprise $x_1, x_2, \ldots, x_n$ and corresponding signals $tx_1$ and $tx_2$ are transmitted via the antenna 204a and 204, respectively. The receive side 200b comprises an antenna 206, RF block 208, chip matched filter block 210, cluster path processor block 212, maximum-ratio combining block 214, despreader block 216, and diversity processor block 218. The actual time varying impulse response of the channels are represented by $h_1$ and $h_2$ on a per base station basis. The cluster path processor block 212, the maximum-ratio combining block 214, the despreader block 216, and the diversity processor block 218 may be integrated within a baseband processor.

After transmitted signals $tx_1$ and $tx_2$ may be received via antenna 206, RF processed by the RF block 208 and W-CDMA bandlimited by the chip matched filter 210, the resulting bandlimited signal may be communicated to the cluster path processor block 212 for processing. Each of the cluster path processors $212a, \ldots, 212n$ in the cluster path processor block 212 may be adapted to generate corresponding channel estimates and lock indicators ($\hat{h}_1$,$L_1$) and ($\hat{h}_2$,$L_2$) per base station. The outputs from each of the corresponding cluster path processors $212a, \ldots, 212n$ in the cluster path processor block 212 may then be communicated to a corresponding maximum-ratio combining blocks $214a, \ldots, 214n$ within the maximum-ratio combining block 214. Each of the maximum-ratio combining blocks $214a, \ldots, 214n$ may be adapted to produce corresponding estimates of the transmitted signals. The corresponding outputs generated from each of the maximum-ratio combining blocks $214a, \ldots, 214n$ may then be communicated to corresponding ones of the despreader blocks $216a, \ldots, 216n$ for processing.

Figure 2B:
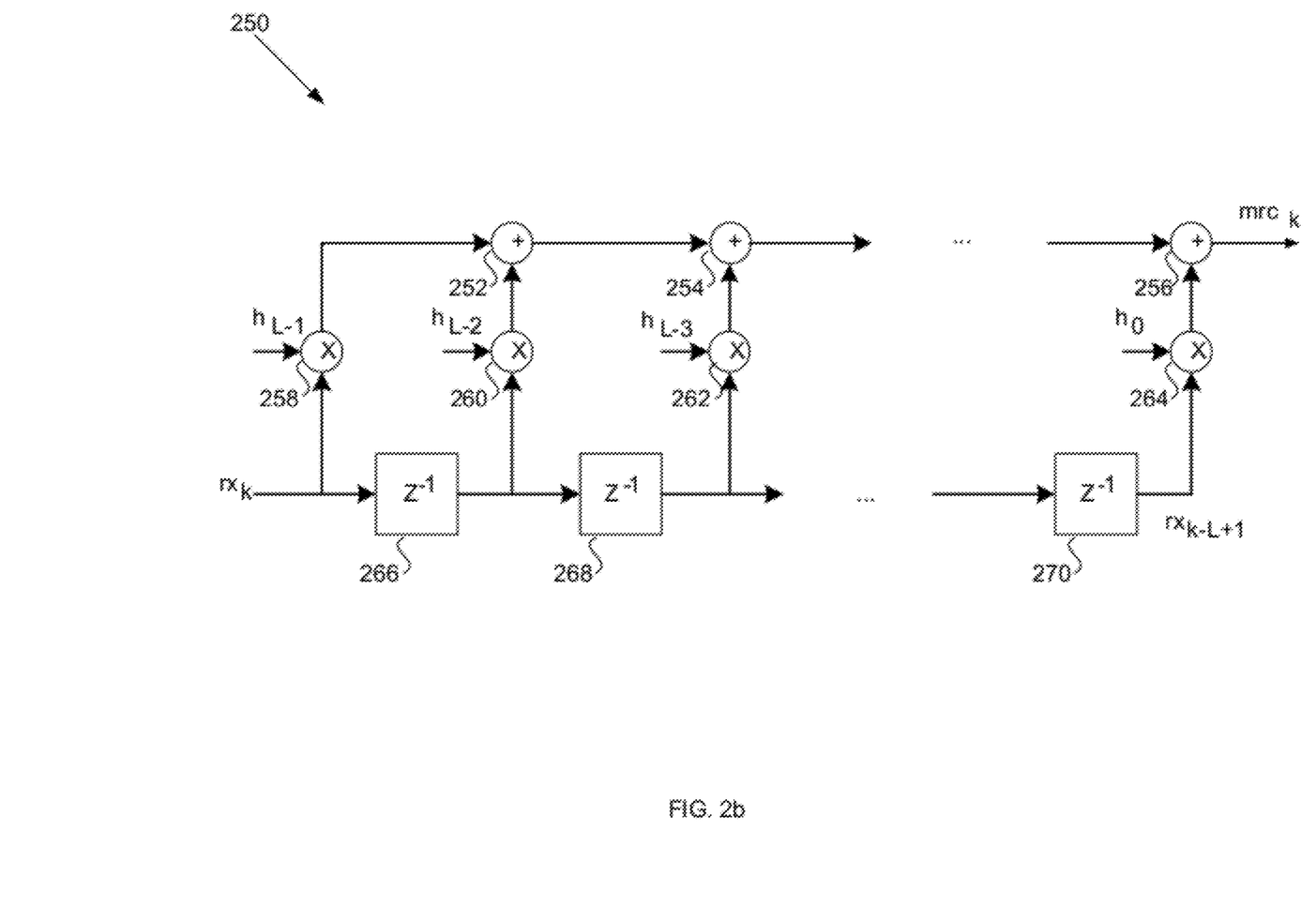
FIG. 2b is a block diagram illustrating exemplary MRC operation, in accordance with an embodiment of the invention.

FIG. 2b is a block diagram illustrating exemplary MRC operation, in accordance with an embodiment of the invention. Referring to FIG. 2b, the maximum-ratio combining (MRC) block 250 may comprise a plurality of adders $252, \ldots, 256$, a plurality of multipliers $258, \ldots, 264$, and a plurality of delay blocks $266, \ldots, 270$. In one embodiment of the invention, the MRC block 250 may receive a plurality of channel estimates $h_{ik}$ (i=0, 1, \ldots, L-1) from a corresponding cluster path processor block. For example, the MRC block 250 may receive estimate vectors $\hat{h}_1$ and $\hat{h}_2$ of the actual time varying impulse response of a channel, from a cluster path processor. Each of the estimate vectors $\hat{h}_1$ and $\hat{h}_2$ may comprise a cluster grid of channel estimates $h_{ik}$ (i=0, 1, \ldots, L-1), where L may indicate the width of the cluster grid of estimates and may be related to the delay spread of the channel.

In operation, the MRC block 250 may be adapted to implement the following equation:

$$mrc_k = \sum_{i=0}^{L-1} h_{L-1-i} \cdot rx_{k-i},$$

where $mrc_k$ is the output of the MRC block 250, $h_{L-1-I}$ is the plurality of channel estimates corresponding to a channel estimate vector, such as $\hat{h}_1$ and $\hat{h}_2$, and $rx_k$ is a filtered complex input signal. The MRC block 250 may be adapted to add individual distinct path signals together in such a manner to achieve a high signal to noise ratio (SNR) in an output signal $mrc_k$.

The MRC block 250 may receive a filtered complex signal $rx_k$ from a chip matched filter (CMF), for example. The filtered complex signal $rx_k$ may comprise in-phase (I) and quadrature (Q) components of a received signal. Furthermore, the filtered complex signal $rx_k$ may be gated by cluster path processor (CPP) output strobes derived from a CPP timing reference, for example. Channel estimates $hi_k$ (i=0, 1, ..., L−1) may be applied to the CMF output $rx_k$ beginning with the last in time, $h_{L-1}$, and proceeding with channel estimates $h_{L-2}, ..., h_0$, utilizing multiplier blocks 258, ..., 264, respectively. The filtered complex input signal $rx_k$ may be continuously delayed by delay blocks 266, ..., 270. Each delayed output of the delay blocks 266, ..., 270 may be multiplied by the multiplier blocks 260, ..., 264, respectively, utilizing corresponding channel estimates $hi_k$. The outputs of the multipliers 252, ..., 256 may be added to generate the output signal $mrc_k$, thereby implementing the above-referenced MRC equation.

Figure 3:
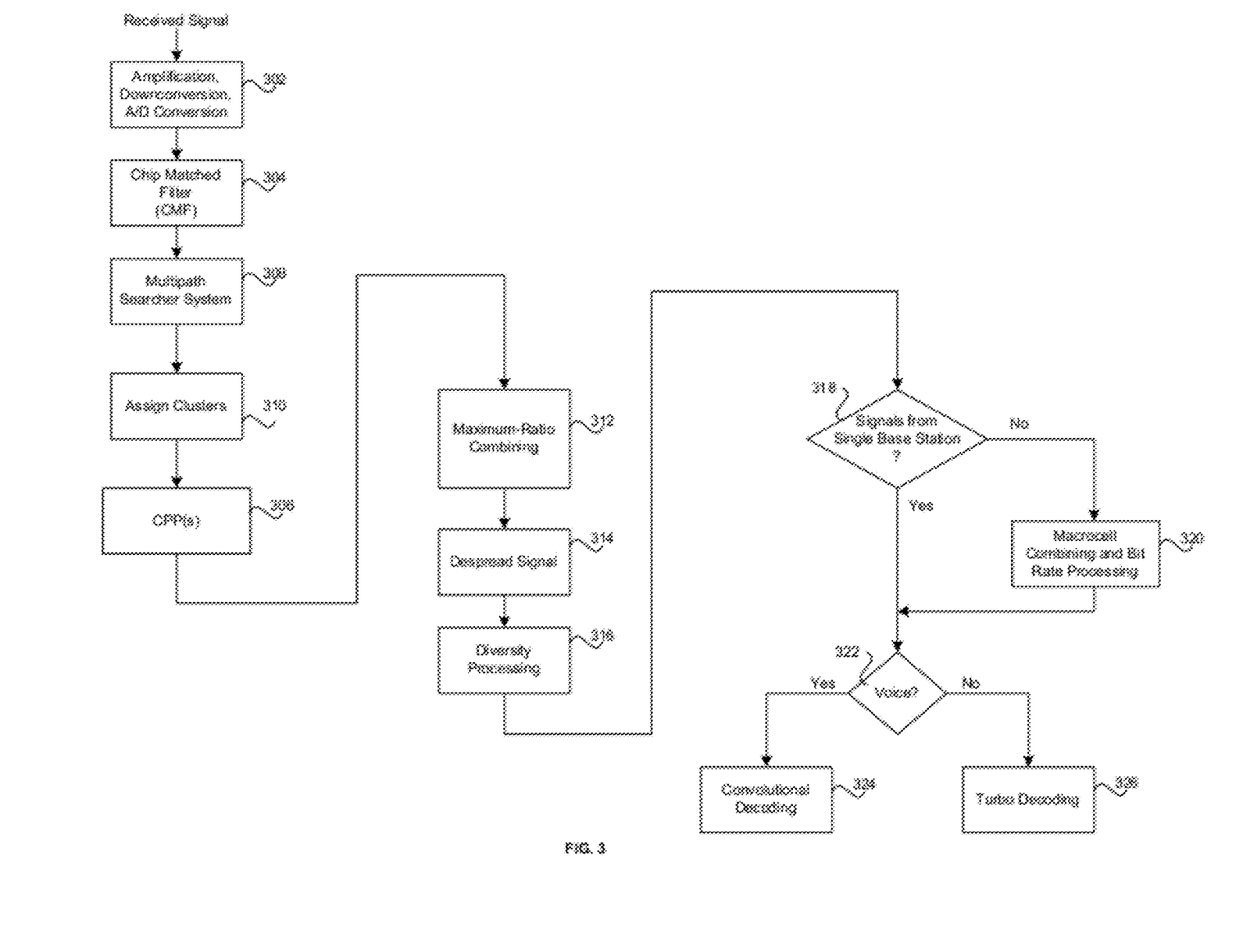
FIG. 3 is a flow chart illustrating exemplary processing steps for an exemplary single antenna receiver system for W-CDMA, in accordance with an embodiment of the invention.

FIG. 3 is a flow chart illustrating exemplary processing steps for an exemplary single antenna receiver system for W-CDMA, in accordance with an embodiment of the invention.

In step 302, a received signal may be amplified, downconverted from assigned RF carrier, and A/D converted. In step 304, the signal may be chip matched filtered to the transmitted pulse shape. In step 306, channel estimates and timing reference signals may be generated comprising the channel estimates and lock indicators ($\hat{h}_1, L_1$) and ($\hat{h}_2, L_2$) and the timing reference signals $T_1$ and $T_2$, corresponding to a plurality of base stations 202. In step 308, received individual distinct path signals may be detected, based on inputs from step 304. In step 308 CPP's 212 may be assigned to individual distinct path signals for maximum-ratio combining based on CPP 212 output from step 306. In step 312, maximum-ratio combining may be performed on the received bandpass filtered signals after step 306. In step 314, despreading may be performed on the signal processed by maximum-ratio combining, utilizing a plurality of CPP 212 timing estimates derived from signals received from a corresponding plurality of base stations. In step 316, diversity processing may be performed on the despread signal. Step 318 may determine whether the received signals are from a single base station. If not, step 320 may perform macrocell combining and bit rate processing on received signals, which have been transmitted from different base stations. Step 322 may determine if the signal contains voice. If the signal does contain voice, step 324 may perform convolutional decoding on the signal. If the signal contains data, step 326 may perform turbo decoding on the signal.

In various embodiments of the invention, the task of managing fingers in typical rake receivers may be greatly simplified. Rather than attempting to assign fingers based on the unpredictable arrival times of individual distinct path signals, in various embodiments of the invention, assignments of cluster path processors 212 in a receiver may be determined based upon a evaluating an output from a multipath searcher after detecting received signal clusters. In this aspect, the invention presents a model in which a plurality of individual distinct path signals may be represented as a signal cluster comprising a plurality of signals with predictable arrival times. By defining a signal cluster model for received individual distinct path signals, the overhead which may be required to manage fingers, the "fat finger" phenomenon, in addition to other shortcomings in conventional rake receiver designs, may be overcome.

Certain embodiments of the invention may be found in a method and system for single antenna receiver system for W-CDMA. Aspects of a method for processing radio frequency (RF) signals may comprise computing channel estimates based on at least one of a plurality of received individual distinct path signals, and generating timing reference signals indicating a location of at least one of the plurality of received individual distinct path signals. At least a portion of the plurality of received individual distinct path signals may be combined based on the computed channel estimates and/or the generated timing reference signals. The combined individual distinct path signals may be processed as a signal cluster, and transmitted information may be extracted from the combined plurality of received individual distinct path signals. Each of the plurality of individual distinct path signals may be received at different instants in time, the latter of which may be based on the generated timing reference signals. A signal cluster may comprise the combined portion of the plurality of received individual distinct path signals.

Other aspects of the method may comprise deriving a sum of chips via combining of the individual distinct path signals. A symbol may be generated based on the derived sum of chips utilizing generated despreading codes. A plurality of the symbols may be combined which are received from a plurality of transmitting antenna and/or which are received from a plurality of transmitting antenna located at a plurality of base transceiver stations. Voice contained in the plurality of received individual distinct path signals may be decoded utilizing convolutional decoding. Data contained in the plurality of received individual distinct path signals may be decoded utilizing turbo decoding.

Aspects of a system for processing RF signals, the system may comprise at least one cluster path processor that computes channel estimates based on at least one of a plurality of received individual distinct path signals, and that generates timing reference signals indicating a location of at least one of the plurality of received individual distinct path signals. A maximum ratio combining processor may be adapted to combine at least a portion of the plurality of received individual distinct path signals based on at least a portion of the computed channel estimates and/or the generated timing reference signals. The maximum ratio combining processor may be adapted to process the combined individual distinct path signals as a signal cluster. Circuitry may be provided that extracts transmitted information from the combined plurality of received individual distinct path signals. Each of the plurality of individual distinct path signals may be received at different instants in time, the latter of which may be based on the generated timing reference signals. The plurality of received individual distinct path signals among those combined may be contained in a signal cluster. A signal cluster may comprise the portion of the combined plurality of received individual distinct path signals.

In other aspects of the system, the maximum ratio combining processor may derive a sum of chips by combining a plurality of individual distinct path signals. The system may further comprise a despreader that generates a symbol based on the derived sum of chips utilizing generated despreading codes. A diversity processor may combine the plurality of symbols which are received from a plurality of transmitting antenna. A macrocell combiner may combine the plurality of symbols, which are received from a plurality of transmitting antenna located at a plurality of base transceiver stations. A convolutional decoder may decode voice contained in the plurality of received individual distinct path signals. A turbo decoder may decode data contained in the plurality of received individual distinct path signals.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing radio frequency (RF) signals, the method comprising:
   receiving a plurality of chip-level data items via a plurality of individual distinct path signals in a signal cluster that is wirelessly received;
   generating channel estimates and timing reference signals utilizing said plurality of received chip-level data items;
   assigning a plurality of rake receiver fingers to said plurality of received individual distinct path signals based on said generated channel estimates and said generated timing reference signals, wherein each of said plurality of chip-level data items corresponds to one of said plurality of assigned rake receiver fingers;
   generating one or more combined chip-level data items by combining at least a portion of said plurality of received chip-level data items utilizing said plurality of assigned rake receiver fingers; and
   generating each of a plurality of symbol-level data items by despreading a corresponding one of said generated one or more combined chip-level data items.

2. The method according to claim 1, wherein each of said plurality of received individual distinct path signals is received at a distinct time instant.

3. The method according to claim 2, comprising determining each said distinct time instant based on said generated timing reference signals.

4. The method according to claim 1, comprising assigning proportionality constants to each of said plurality of rake receiver fingers based on said generated channel estimates.

5. The method according to claim 4, comprising maximum-ratio combining said at least a portion of said plurality of received chip-level data items utilizing said assigned corresponding proportionality constants.

6. The method according to claim 1, comprising processing said plurality of received individual distinct path signals as said signal cluster during said combining.

7. The method according to claim 1, comprising generating said each of said plurality of symbol-level data items by utilizing one or more generated despreading codes.

8. The method according to claim 7, comprising combining at least a portion of said plurality of symbol-level data items.

9. The method according to claim 8, comprising combining said at least a portion of said plurality of symbol-level data items when said plurality of received individual distinct path signals are received from a plurality of base transceiver stations.

10. The method according to claim 8, comprising:
   determining whether said combined at least a portion of said plurality of symbol-level data items comprise voice communications information or data communications information;
   decoding said combined at least a portion of said plurality of symbol-level data items by utilizing convolutional decoding when said combined at least a portion of said plurality of symbol-level data items comprise voice communications information; and
   decoding said combined at least a portion of said plurality of symbol-level data items by utilizing turbo decoding when said combined at least a portion of said plurality of symbol-level data items comprise data communications information.

11. A system for processing RF signals, the system comprising:
   one or more circuits comprising at least one cluster path processor and a maximum ratio combining processor, said one or more processors and/or circuits being operable to:
   receive a plurality of chip-level data items via a plurality of individual distinct path signals in a signal cluster that is wirelessly received;
   generate channel estimates and timing reference signals utilizing said plurality of received chip-level data items;
   assign a plurality of rake receiver fingers to said plurality of received individual distinct path signals based on said generated channel estimates and said generated timing reference signals, wherein each of said plurality of chip-level data items corresponds to one of said plurality of assigned rake receiver fingers;
   generate one or more combined chip-level data items by combining at least a portion of said plurality of received chip-level data items utilizing said plurality of assigned rake receiver fingers; and
   generate each of a plurality of symbol-level data items by despreading a corresponding one of said generated one or more combined chip-level data items.

12. The system according to claim 11, wherein each of said plurality of received individual distinct path signals is received at a distinct time instant.

13. The system according to claim 12, wherein said one or more processors and/or circuits are operable to determine each said distinct time instant based on said generated timing reference signals.

14. The system according to claim 11, wherein said one or more processors and/or circuits are operable to assign proportionality constants to each of said plurality of rake receiver fingers based on said generated channel estimates.

15. The system according to claim 14, wherein said one or more processors and/or circuits are operable to maximum-ratio combine said at least a portion of said plurality of received chip-level data items utilizing said assigned corresponding proportionality constants.

16. The system according to claim 11, wherein said one or more processors and/or circuits are operable to process said plurality of received individual distinct path signals as said signal cluster during said combining.

17. The system according to claim 11, wherein said one or more processors and/or circuits are operable to generate said each of said plurality of symbol-level data items by utilizing one or more generated despreading codes.

18. The system according to claim 17, wherein said one or more processors and/or circuits are operable to combine at least a portion of said plurality of symbol-level data items.

19. The system according to claim 18, wherein said one or more processors and/or circuits are operable to combine said at least a portion of said plurality of symbol-level data items when said plurality of received individual distinct path signals are received from a plurality of base transceiver stations.

20. A method for processing radio frequency (RF) signals, the method comprising:

receiving a plurality of chip-level data items via a plurality of individual distinct path signals in a signal cluster that is wirelessly received;

generating channel estimates and timing reference signals utilizing said plurality of received chip-level data items;

generating lock indications of which components in said generated channel estimates comprises valid components values;

assigning a plurality of rake receiver fingers to said plurality of received individual distinct path signals based on said generated channel estimates, said generated lock indicators, and said generated timing reference signals, wherein each of said plurality of chip-level data items corresponds to one of said plurality of rake receiver fingers; and     generating each of a plurality of symbol-level data items from one or more combined chip-level data items from at least a portion of said plurality of received chip-level data items utilizing said plurality of assigned rake receiver fingers.

\* \* \* \* \*